United States Patent
Spanke et al.

(10) Patent No.: US 8,223,035 B2
(45) Date of Patent: Jul. 17, 2012

(54) METHOD FOR COMMISSIONING AND/OR OPERATING A COMMUNICATION SYSTEM

(75) Inventors: Dietmar Spanke, Steinen (DE); Michael Heim, Hausen (DE); Martin Link, Merdingen (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 717 days.

(21) Appl. No.: 12/086,616

(22) PCT Filed: Dec. 6, 2006

(86) PCT No.: PCT/EP2006/069367
§ 371 (c)(1),
(2), (4) Date: Apr. 17, 2009

(87) PCT Pub. No.: WO2007/077085
PCT Pub. Date: Jul. 12, 2007

(65) Prior Publication Data
US 2010/0019931 A1    Jan. 28, 2010

(30) Foreign Application Priority Data
Mar. 24, 2006    (DE) .................. 10 2006 014 102

(51) Int. Cl.
*G08C 19/22* (2006.01)
*H04Q 9/00* (2006.01)
(52) U.S. Cl. .................................. 340/870.07
(58) Field of Classification Search .............. 340/870.07
See application file for complete search history.

(56) References Cited

U.S. PATENT DOCUMENTS

| | | |
|---|---|---|
| 4,520,488 A | 5/1985 | Houvig |
| 5,469,746 A | 11/1995 | Fukunaga |
| 6,601,005 B1 | 7/2003 | Eryurek |

FOREIGN PATENT DOCUMENTS

| | | |
|---|---|---|
| DE | 69529180 T2 | 10/1995 |
| DE | 103 47 584 | 5/2005 |
| DE | 200 23 852 U1 | 1/2007 |
| EP | 0 591 926 A1 | 4/1994 |
| GB | 2173330 A | 10/1986 |
| WO | WO 96/12993 | 5/1996 |

*Primary Examiner* — Hal Kaplan
(74) *Attorney, Agent, or Firm* — Bacon & Thomas, PLLC

(57) ABSTRACT

A method for start-up and/or operation of a communication system composed of at least one multivariable sensor, at least one converter unit and at least one receiving unit, which are connected with one another via a two-wire line. A wherein a primary measured value in the form of an analog signal and extra measured values in the form of an encoded digital signal modulated on the analog signal are provided from the multivariable sensor via the two-wire line, wherein only analog signals are received by the receiving unit. The extra measured values are scaled in the multivariable sensor into formatted values by means of a conversion algorithm, wherein at least the formatted values are requested and received by the converter unit, and wherein corresponding analog signals of the extra measured values are produced from the formatted values in the converter unit by a fixedly predetermined, unconfigurable, reconversion algorithm. The analog signals of the extra measured values are transmitted via respective separate electrical current lines to the receiving unit.

10 Claims, 1 Drawing Sheet

METHOD FOR COMMISSIONING AND/OR OPERATING A COMMUNICATION SYSTEM

TECHNICAL FIELD

The invention relates to a method for start-up and/or operation of a communication system composed of at least one multivariable sensor, at least one converter unit and at least one receiving unit, which are connected with one another via a two-wire line.

BACKGROUND DISCUSSION

In the field of automation- and process-control-technology, the individual components of a process automation system are generally locationally distributed in the process plant, which makes a communication system necessary for exchange of information between the individual components and/or a control station. Such communication systems for process automation technology must fulfill high technological demands, such as e.g. interface standardizing, Ex-protection, information security, interruption safety, real time applications, simple installation and variable network topology. Considering demands such as these, besides conventional analog field devices with standardized, unidirectional, 4-20 mA electrical current signal outputs, currently also a number of powerful field devices with expanded digital communication capabilities have established themselves. In order to enable a simple integration of these more powerful field devices into existing plants containing 4-20 mA communication, a method has become common, wherein a digitized, high-frequency signal is modulated onto the 4-20 mA electrical current signal for the purpose of carrying additional information. Above all, the HART-standard (HART=Highway Addressable Remote Transducer) has established itself here as a generally valid standard for bidirectional communication between individual field components with the assistance of digital signals. The HART-protocol, which works according to the Bell 202-communications standard using the FSK-method (FSK=Frequency Shift Keying), provides, besides a unidirectional data transmission by 4-20 mA current signal, an additional, bidirectional data transmission using half-duplex communication between, for example, a field device and a control station. Through the supplemental HART-signal, for example, an opportunity has been created for simpler parametering and also for diagnosis of field devices through exchange of status reports.

By adding "intelligence" to the measuring devices in the form of, for example, a microprocessor, multivariable sensors are possible, which, besides ascertaining a primary measured value, ascertain extra measured values, as well as being able to perform diagnostic and analytical functions. Examples of multivariable sensors include transducing flow and viscosity, as measured variables, with a single, Coriolis, flow sensor, and ascertaining pressure difference, absolute pressure and process temperature with a single, pressure sensor. With the help of such multivariable sensor technology, on the one hand, a plurality of different, measured values can be ascertained from the measurement signal, and, on the other hand, additional functions, such as diagnostic functions, maintenance functions, analytical- and evaluating-functions for pre-processing of measured values can be integrated into the multivariable sensor.

A type of embodiment of multilayered communication is that wherein a modulation of a supplemental, digital, HART-signal is effected onto an analog, 4-20 mA, electrical current signal. This has the advantage, that the network topology and older, analog-communicating, field devices can be kept in current communication systems and only small changes must be made in the control system or at the communication partner, since the two different types of communication, i.e. the digital, HART signal and the analog, electrical current signal, do not influence one another. By integrating the ascertaining of different measured variables into a single multivariable sensor, the number of field devices, as well as their process connections, are lessened in a process plant, as a result of which costs for planning, installation, operation and start-up of the multivariable sensors in the process plant turn out to be less. Such multivariable sensors are used in plants running technological methods, such as e.g. occur in the chemical industry, in the pharmaceutical industry, in the foods industry, in the oil and gas industry and/or in the wastewater field.

Also purely digital, fieldbus devices are marketed. An aspect of this is that a large number of different fieldbus systems exist. By way of example, these include PROFIBUS DP, PROFIBUS PA, Foundation fieldbus and CAN. The areas of use of all known bus systems involve special tasks and applications. For this reason, a multitude of field devices exist for various bus systems, and the field devices of one bus system cannot, in general, be compatibly replaced by field devices of another bus system. Fieldbus devices can, it is true, exchange data relatively rapidly via a fieldbus and offer new diagnostic- and monitoring-opportunities; however, their use is limited to, most often, completely newly installed automated plants, in which a new, digital, process control system is provided. This is the reason why the spread of purely digitally communicating fieldbus devices is happening only slowly in process automation technology. A great disadvantage of these purely digitally communicating, fieldbus devices is that they cannot be integrated into existing process plants using analog communication via two-conductor technology.

In order that there be faultless functioning of communication of measured values and diagnostic- and monitoring-values between the intelligent individual components spatially distributed in a process plant, it is necessary that the communication interfaces be matched to one another. For this, such interfaces, as well as further processing mechanisms of the individual field components, are matched by corresponding parametering at start-up.

In order that multivariable sensors can be used in existing process plants having purely analog operating control systems, converters are available, which read-out the digital, HART-signal and convert such into corresponding analog signals in the form of electrical current signals. Such converters include, for example, the TRI-LOOP converter of Rosemount Inc. and the SPA converter of Moore Industries. These converters have the disadvantage that they must first be configured at start-up of the communication system. This has for operators of process plants the disadvantage that additional devices must be configured, and the accompanying inputting of parameters provides an additional source of potential errors.

SUMMARY OF THE INVENTION

An object of the present invention is to enable a simplified and secure parametering of individual field components of a communication system.

This object is achieved according to the invention by a method for start-up and/or operation of a communication system composed of at least one multivariable sensor, at least one converter unit and at least one receiving unit, which are connected with one another via a two-wire line, wherein a primary measured value in the form of an analog signal and extra measured values in the form of an encoded digital signal modulated on the analog signal are provided from the multivariable sensor via the two-wire line, wherein only analog signals are received by the receiving unit, wherein the extra measured values are converted in the multivariable sensor into formatted values by means of a conversion algorithm, wherein at least the formatted values are requested and received by the converter unit, wherein corresponding analog signals of the extra measured values are produced from the formatted values in the converter unit by a fixedly predetermined, unconfigurable, reconversion algorithm, and wherein the analog signals of the extra measured values are transmitted via respective separate electrical current lines to the receiving unit. As a result of this method, only the multivariable sensors must be configured and parametered at start-up, since the extra measured values are converted to a formatted value. Since the scaling of the extra measured values to the measuring range or to the electrical current signal range is accomplished completely in the multivariable sensor, the formatted value in the converter unit only needs to be converted back into an electrical current signal according to a fixed predetermined reconversion algorithm. The reconversion algorithm can involve, most often, a simple linear conversion of the numerical value of the formatted value into a corresponding electrical current; however, also quadratic conversion or other types of conversion algorithms can be used. The reconversion algorithm of the converter unit must, however, be known, so that, in the configuration of the multivariable sensors, its conversion algorithm can be correspondingly matched. The converter unit must no longer be configured at start-up of the communication system, since it is at least no longer dependent on the measuring range of the multivariable sensor.

In an embodiment of the method, the formatted values are converted as absolute values. The absolute value represents a numerical value of the extra measured value scaled to the measuring range. The numerical value of the absolute value can be converted in the converter unit as a function of a reconversion factor of the reconversion algorithm directly into a corresponding electrical current.

In a further embodiment of the method, the formatted values are converted as relative values. The relative value reflects the fraction of the measuring range. Through the matched conversion by means of the conversion algorithm in the multivariable sensor, the measuring range is mapped to the electrical current range of the converter unit.

A purpose-supporting embodiment of the method is one wherein, in the converter unit, it is detected, whether absolute values or relative values are being received. In case the converter unit in its query to the multivariable sensor does not explicitly predetermine the type of the formatted value provided as response, this inquiry is necessary, since, in this way, the type of the formatted value can be ascertained.

In an advantageous form of embodiment of the method, it is provided, that the relative values are converted to percent values in the ratio range of 0 to 100 percent and/or the absolute values are converted to electrical current values in the range between 4 to 20 mA. The relative value represents a fraction of the adjustable electrical current range of the analog signal as percent values. If, for example, a relative value of 50 percent is transmitted, then the converter unit yields, in the case of linear reconversion, a current of 12 mA (milliampere). The absolute value specifies the electrical current value as a numerical value, which the converter unit should output as electrical current.

A very advantageous variant of the method provides that the relative values are converted by the reconversion algorithm in the converter unit linearly into corresponding analog signals.

In an advantageous form of embodiment of the method, it is provided, that the converter unit can detect an error state of the relative values or an error state in the converting of relative values into corresponding analog signals. If relative values outside of the ratio range of 0 to 100 percent or absolute values outside of the electrical current range of 4-20 mA are transmitted from the multivariable sensors to the converter unit, then an error of the measured value is recognized.

In an advantageous form of embodiment of the method, it is provided, that, in the error state of the relative values, a corresponding analog signal is transmitted from the converter unit via separate electrical current lines to the receiving unit. The error state is transmitted according to the HART-standard via the electrical current line to the receiving unit or to the control system by an error current of, for example, 3.6 mA or 21.5 mA.

In an advantageous form of embodiment of the method, in the error state of the relative values, corresponding error reports are transmitted as digital signals and/or analog signals from the converter unit via the two-wire line to the multivariable sensor. An error state of the relative values of the extra measured values and/or of the primary measured value in the converter unit is transmitted to the corresponding multivariable sensor, and/or, in accordance therewith, a new measuring cycle is initiated by the converter unit. This error state of the relative values in the converter unit expresses itself, for example, in such a manner, that a relative value outside of the range of 0-100% is ascertained.

Furthermore, it is provided, that the conversion algorithm is matched and/or input in the parametering of the multivariable sensor. Through the matching of the conversion algorithm in the parametering of the multivariable sensor, it is possible to match the conversion of the extra measured values into relative values or absolute values to the measuring range of the multivariable sensor and to the electrical current range of the converter unit.

Other features and advantages the invention will become evident from the following description, in which the construction and operation of a form of embodiment according to the invention is explained in detail on the basis of schematic drawings. For simplification, identical parts in the drawings have been provided with equal reference characters.

DETAILED DISCUSSION

Figure 1:
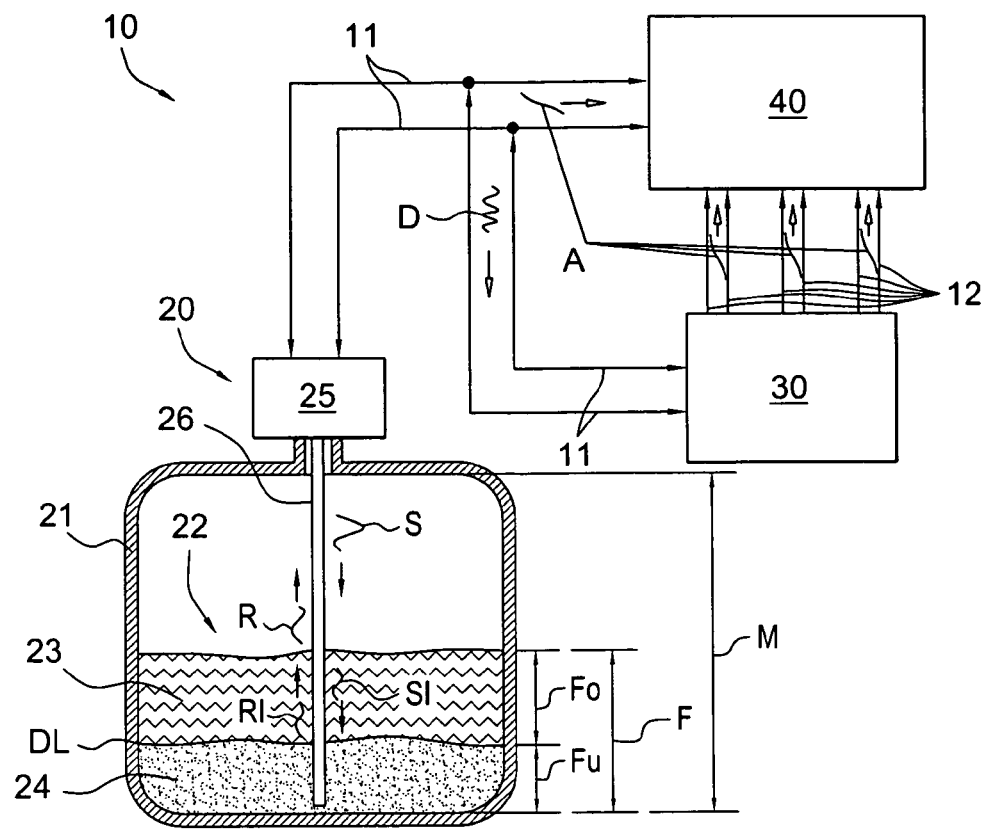
FIG. 1 a block diagram of a preferred form of embodiment of a communication system of the invention.

FIG. 1 shows the communication system 10 composed of a multivariable sensor 20, a converter unit 30 and a receiving unit 40, which are connected with one another via a two-wire line 11. The multivariable sensor 20 is shown in this example of an embodiment e.g. as a time-domain reflectometer or TDR-measuring system for ascertaining continuous fill level F of a fill substance 22 in a container 21 using a surface waveguide 26 and a measurement transmitter 25. The method can, however, also be performed with all other types of multivariable sensors 20 or actuators, which receive or transmit additional data, e.g. in the form of extra measured values EV, via a two-wire line 11, for example, according to the HART-standard, as digital signal D. The extra measured values EV include, according to the HART-standard, basically a secondary measured value SV, a tertiary measured value TV and/or a quaternary measured value QV.

According to the method of guided microwaves or the time-domain reflectometry or TDR-measuring method (Time Domain Reflection), a high-frequency pulse is transmitted as measurement signal along a Sommerfeld or Goubau waveguide or along a coaxial waveguide. At a change of the dielectric constant of the fill substance 22 surrounding the waveguide, a part of the energy of the measuring signal is at least partially reflected back to the in-coupling region of the surface waveguide 26 and received by the measurement transmitter 25. From the time difference between the sending of the measuring signal (transmission signal S) and receipt of the reflected measuring signal (reflection signal R), the travel time of the measuring signal between a fixed point in the in-coupling region and the upper surface of the fill substance 22 can be ascertained. Apparatuses and methods for determining fill level F via the travel time of high frequency signals, or other measuring signals, such as e.g. ultrasound, utilize the physical law that the traveled distance equals the product of travel time and propagation velocity of the measuring signal. Taking into consideration the geometry of the container 21, the fill-level F of the fill substance 22 can be ascertained as a relative or absolute quantity. The FMCW-method (Frequency Modulated Continuous Waves), in which the frequency of a continuous measurement signa changes and distance is measured by the frequency difference of the transmitted, relative to the reflected, measurement signal, is likewise performable in connection with the above-described, travel-time, measuring principle.

The forming of a dividing layer DL, or interface, of the fill substance 22 happens when at least two different media 23, 24 are present in the container 21, and they do not mix, such as in the case of water and oil. In order to be able to measure weight, or volume, of both media 23, 24 separately, it is necessary to measure the over-interface fill level FO occupied by the upper medium 23, the under-interface fill level FU occupied by the lower medium 24, or the dividing layer DL, or interface, between the two media 23, 24. In the case of the dividing layer measurement, in addition to the reflection signal R on the upper surface of the upper medium 23, a further interface-reflection signal $R_I$ at the dividing layer DL between the upper medium 23 and the lower medium 24 is ascertained. By means of this interface-reflection signal $R_I$, it is possible to ascertain the over-interface fill level FO of an upper medium 23 and/or the under-interface fill level FU of a lower medium 24. In order that this interface-reflection signal $R_I$ can be detected, it is necessary, that not all of the energy of the transmission signal S be reflected on the upper surface of the upper medium 23, but that, instead, a part of the transmission signal S be transmitted as interface-transmission-signal $S_I$ in the upper medium 23. Transmission and reflection of the transmission signal S and interface-transmission signal $S_I$ depends mainly on the dielectric constants of the media 23, 24 being measured.

In order that the multivariable sensor 20 can be matched to the conditions of the process and the process plant, the multivariable sensor 20 must be appropriately configured and parameterized before being put into use. An operating tool, for example, in the form a HART service unit, serves, in such case, for parametering, configuring and diagnosis, as well as for support of service or maintenance activities, data management and documentation of the multivariable sensor 20. A configuring of the multivariable sensors 20 can be performed on-site via corresponding push buttons and a display on the measurement transmitter 25, this not being explicitly shown in FIG. 1.

Due to the increased information- and data-production of multivariable sensors 20, such sensors support, besides the classic 4-20 mA current signal, also expanded multi-channel communication protocols, such as, for example, the HART-protocol. In order that these expanded communication protocols can be used in existing process plants having a receiving unit 40, or a control system unit, using exclusively analog, 4-20 mA current signal interfaces, these expanded communication protocols (such as e.g. HART, which uses, additionally, a digital signal D modulated onto an analog signal) must be converted into a corresponding analog signal A, such as e.g. a 4-20 mA current signal. This conversion of the, for example, digital HART-signals into analog 4-20 mA electrical current signals is performed by means of a converter unit 30. Converter unit 30 reads the extra measured values EV as digital signals D, e.g. HART-signals, on the two-wire line 11 between the multivariable sensor 20 and the receiving unit 40 and forwards such as corresponding analog signals A, e.g. as 4-20 mA electrical current signals, via additional electrical current lines 12, to the receiving unit 40. The conversion of the extra measured values EV, as digital signals D, into corresponding analog signal A is performed in the converter unit 30.

The HART-protocol works according to the master-slave method, wherein the converter unit 30 is embodied as a master of two possible masters in a HART-communication system 10 and the multivariable sensors 20 are embodied as slaves of the communication system 10. With the help of predefined commands, the master issues orders to a multivariable sensor 20 or transmits data. Thus, desired values, actual values, and parameters can be transmitted, and various services for start-up and diagnosis can take place. The multivariable sensors 20 respond directly with an acknowledging telegram, which contains possibly requested, status reports and/or data of the multivariable sensor 20.

Activity of the communication is controlled from the master, i.e. the converter unit 40 sends to the multivariable sensor 20, for example, a request signal, or command, for output of the measured values, whereupon sensor 20 sends back via the two-wire line 11 the requested primary measured value PV as analog signal A and the extra measured values EV, or status-signals, as digital signals D. The converter unit 30, as master, can, by a command, place the multivariable sensor 20 as slave into a so-called burst-mode, so that a cyclic response of the slave is initiated for output of the primary measured value PV, scaled to the set measuring range M, and the extra measured values EV. This cyclic response is continued, until, in turn, a break-command is sent by the master. The configuration of the converter unit 30 of the invention is fixedly predetermined, such that it requests the extra measured values of the multivariable sensors 20 via the two-wire line 11 only as digital relative values RV or as digital absolute values AV. The extra measured values EV are converted in the multivariable sensor 20 by a conversion algorithm into corresponding digital absolute values AV or digital relative values RV of analog signals A, which correspond to the extra measured values EV with a conversion factor. The conversion factor is calculated in the configuration of the multivariable sensor 20 by means of the conversion algorithm, with input of the measuring range M of the extra measured values EV, the range of the analog signals A and the units of the extra measured values EV. The relative values RV or absolute values AV are transmitted from the multivariable sensor 20 via the two-wire line 11 to the converter unit 30. The converter unit 30 must no longer be configured by the operator of the communication system 10 by input of measuring ranges M and units, but, instead, converts the digital relative values RV or digital absolute values AV directly and linearly via a reconversion algorithm into corresponding analog signals A. Via optional parametering switches on the converter unit 30, predetermined configurations and parametering models of the converter unit 30 can be selected and set. These parametering switches are not explicitly shown in the drawing. Through these parametering switches, it is possible for the plant operator to configure the converter unit 30 in such a manner, that only the desired extra measured values EV and/or the primary measured value PV are/is transmitted in an appropriate format and selected units from the converter unit 30 to the receiving unit 40. In a standard setting, the converter unit 30 is, however, so set, that it converts the extra measured values EV into corresponding relative values RV or absolute values AV of the loop current.

The analog signals A of the extra measured values EV produced by the reconversion in the converter unit 30 are forwarded via separate electrical current lines 12 to the receiving unit 40. Receiving unit 40 is, for example, a control system (DCS—Distributed Control System) or a programmable logic controller (PLC).

In a communication system 10 designed with an emphasis on safety, the primary measured value PV is transmitted, in addition to the analog signal A in the form of a 4-20 mA current signal, as a digital signal D in the form of the secondary measured value SV. The has the advantage, that the primary measured value PV is transmitted in two ways and, in the receiving unit 40, the two types of transmission can be checked against one another. At the same time, it is possible by this additional checking function to review the conversion of the extra measured values EV into absolute values AV or relative values RV by the conversion algorithm or to calibrate the electrical current outputs of the electrical current lines 12 of the converter unit.

Figure 2:
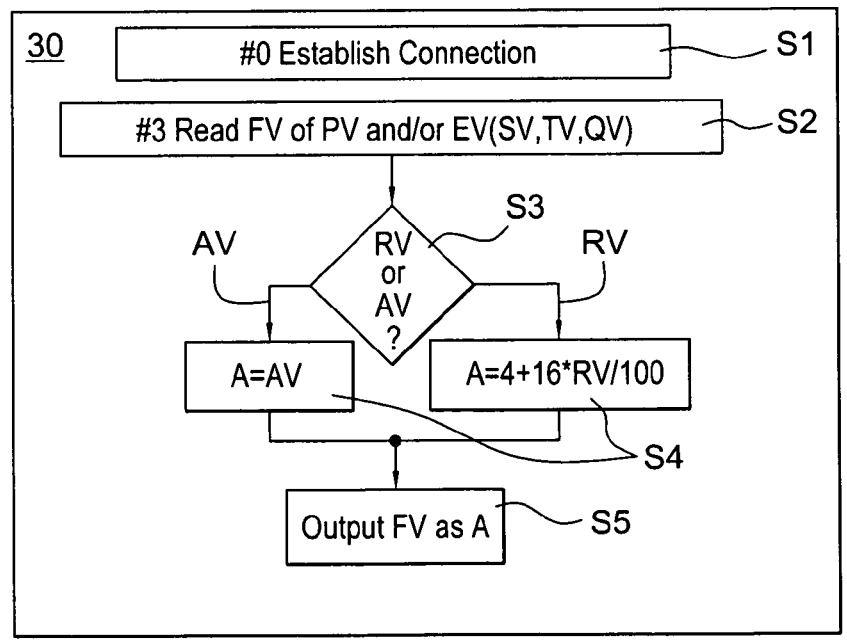
FIG. 2 a flow diagram of the converting of the HART-signal of a second, third and/or fourth value into an analog current signal in the converter unit of the invention.

FIG. 2 sketches a processing cycle of the reconversion algorithm of the converter unit 30. In a first method step S1, the communication connection of the converter unit 30 to the multivariable sensor 20 is initialized via the HART-command No. 0. In this initializing step, the connection to the multivariable sensors 20 is established by read-out of parameters and performing test routines.

In the second method step S2, the converter unit 30 asks a multivariable sensor 20, by transmission of a HART-command, e.g. HART-command No. 3, to output the primary measured value PV, as an analog signal A in the form of a 4-20 mA current signal, and the extra measured values EV on the two-wire line 11. In total, each multivariable sensor 20 delivers up to three extra measured values EV, or variables, in floating point format. The extra measured values EV can be predefined via the HART-command No. 51. The extra measured values EV are received by the converter unit 30. The absolute value AV is, in this example of an embodiment, a numerical value corresponding to an electrical current value of the analog signal A in mA (milliampere). The relative value RV gives the fraction of the span of the analog signal A in percent.

By checking the transmitted units of the extra measured values EV, it is ascertained in a third method step S3, whether the relative values RV have units in percent or are absolute values AV with units in mA. If an absolute value AV has been transmitted, then the numerical value of the absolute value AV is converted directly into a corresponding current as analog signal A. If, in contrast, a relative value RV has been transmitted, then the current as analog signal A is produced in such a manner, that, from the relative value RV, the percent fraction of the variation range of the electrical current is ascertained. This percent fraction of the electrical current is then added to a minimum electrical current value of, for example, 4 mA (milliampere), in order to obtain a corresponding electrical current as output signal A. Conversion of the relative values RV into corresponding electrical currents as analog signal A is described by following equation:

$$A[mA] = 4\ mA + \frac{16\ mA + RV}{100}$$

In the fifth method step S5, the set electrical current is output as analog signal A on the appropriate electrical current line 12. The electrical current lines 12 are, generally, analog, two-conductor lines. Since the converter unit 30 is embodied unconfigurably, the association of the individual electrical current lines 12 to the corresponding, extra measured values EV is fixedly specified. Thus, for example, output on the first electrical current line 12 is the secondary measured value SV, on the second electrical current line 12 the tertiary measured value TV and on the third electrical current line 12 the quaternary measured value QV, all as analog signals in the form of 4-20 mA, electrical current signals.

The invention claimed is:

1. A method for start-up and/or operation of a communication system composed of at least one multivariable sensor, at least one converter unit and at least one receiving unit, which are connected with one another via a two-wire line, comprising the steps of:

providing from the multivariable sensor via the two-wire line a primary measured value in the form of an analog signal and extra measured values in the form of an encoded digital signal modulated on the analog signal;
receiving only analog signals by the receiving unit;
converting the extra measured values in the multivariable sensor into formatted values by means of a conversion algorithm;
requesting at least the formatted values and received by the converter unit;
producing corresponding analog signals of the extra measured values from the formatted values in the converter unit by a fixedly predetermined, unconfigurable, reconversion algorithm; and
transmitting the analog signals of the extra measured values via respective separate electrical current lines to the receiving unit.

2. The method as claimed in claim 1, further comprising the step of:

converting the extra measured values in the multivariable sensor into absolute values by means of the conversion algorithm.

3. The method as claimed in claim 2, wherein:

it is detected in the converter unit, on the basis of units of the extra measured values, whether absolute values or relative values are received.

4. The method as claimed in claim 1, further comprising the step of:

converting the extra measured values in the multivariable sensor into relative values by means of the conversion algorithm.

5. The method as claimed in claim 1, wherein:
converting the extra measured values in the multivariable sensor relative values as percent values in the ratio range of 0 to 100 percent; and/or
converting the extra measured values in the multivariable sensor into absolute values as electrical current values in the electrical current range between 4 to 20 mA.

6. The method as claimed in claim 1, wherein:
the relative values are converted by the reconversion algorithm in the converter unit linearly into corresponding analog signals.

7. The method as claimed in claim 1, wherein:
an error state of the relative values, or an error state in the conversion of relative values into corresponding analog signals, is detected by the converter unit.

8. The method as claimed in claim 7, wherein:
in an error state of the relative values, a corresponding error report is transmitted as analog signals from the converter unit via the separate electrical current lines to the receiving unit.

9. The method as claimed in claim 7, wherein:
in an error state of the relative values, a corresponding error report is transmitted as digital signals and/or analog signals from the converter unit via the two-wire line to the multivariable sensor.

10. The method as claimed in claim 1, wherein:
the conversion algorithm is matched and/or input in parametering process of the multivariable sensor.

* * * * *